Dec. 3, 1963

R. E. KINNEY 3,112,895

SPIRAL TAPE WINDING MACHINE

Filed Dec. 11, 1961

Robert E. Kinney
INVENTOR.

BY J. W. Mills
ATTORNEY

Robert E. Kinney
INVENTOR.

Dec. 3, 1963   R. E. KINNEY   3,112,895
SPIRAL TAPE WINDING MACHINE
Filed Dec. 11, 1961   5 Sheets-Sheet 3

Robert E. Kinney
INVENTOR.

BY *J. M. Nall*
ATTORNEY

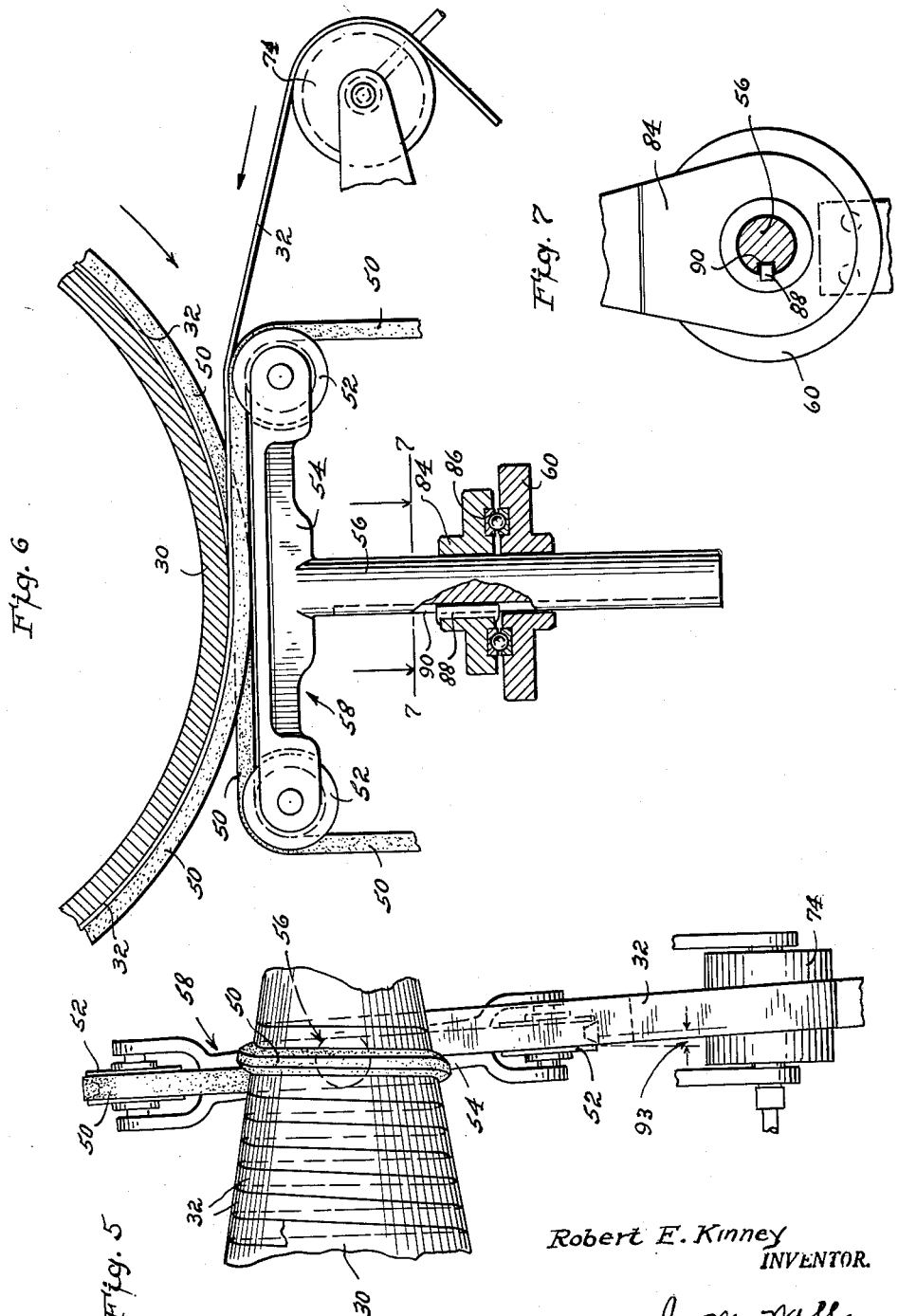

Dec. 3, 1963 R. E. KINNEY 3,112,895
SPIRAL TAPE WINDING MACHINE
Filed Dec. 11, 1961 5 Sheets-Sheet 5
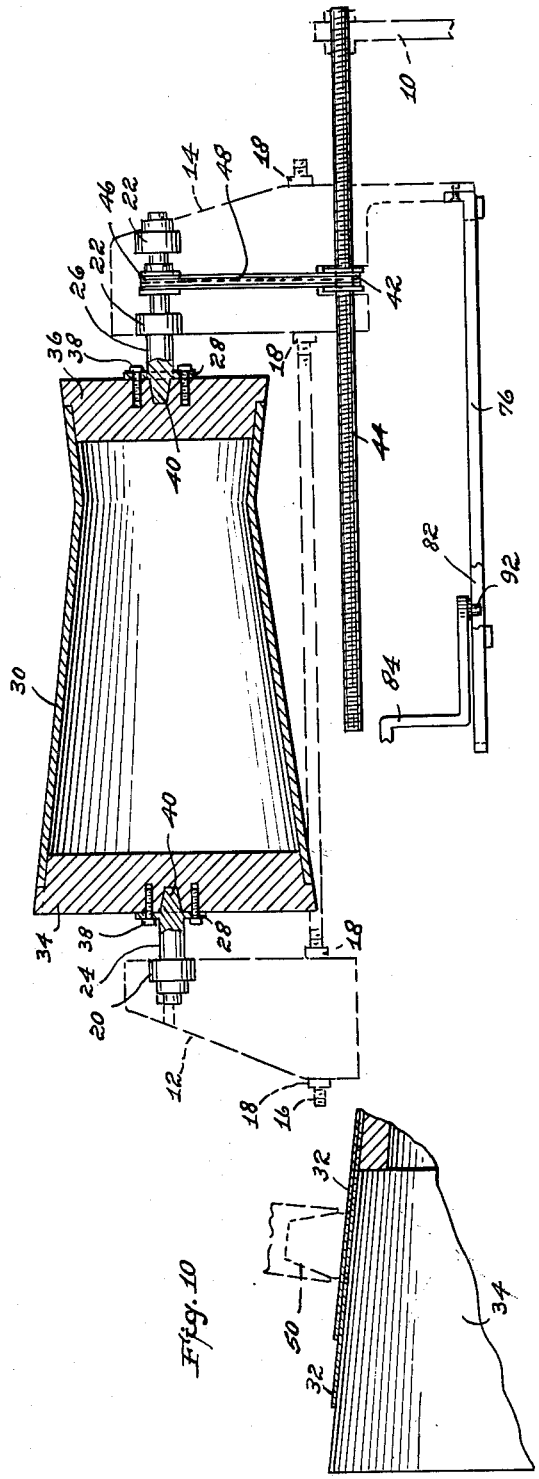
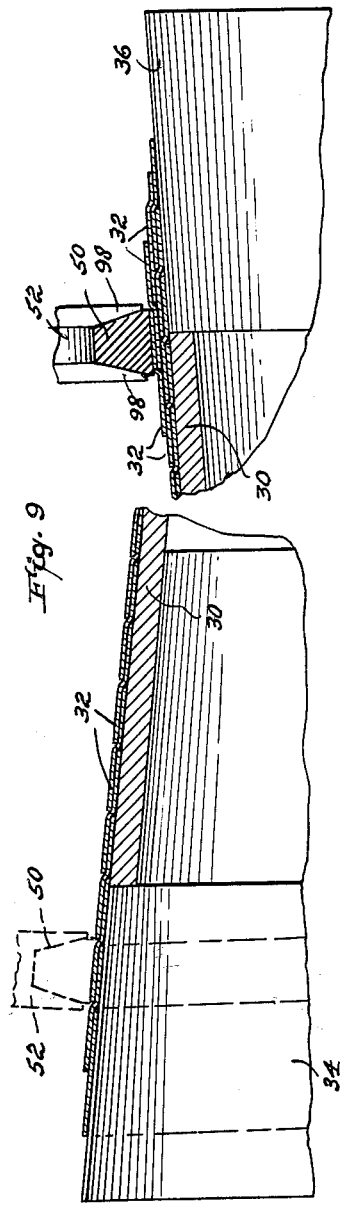
Robert E. Kinney
INVENTOR.
BY
ATTORNEY

United States Patent Office 3,112,895
Patented Dec. 3, 1963

3,112,895
SPIRAL TAPE WINDING MACHINE
Robert E. Kinney, Pennington, N.J., assignor to Crossley Machine Company, Inc., a corporation of New Jersey
Filed Dec. 11, 1961, Ser. No. 158,955
11 Claims. (Cl. 242—7)

This invention relates to machines or apparatus for the spiral winding of tape on bodies having circular peripheral surfaces, such as bodies of cylindrical or conical formation.

One of the principal objects of the present invention is to provide a machine for the spiral winding of tape on a body of the formation mentioned with great firmness without longitudinal tensional strain on the tape.

Another object of the invention is to provide a machine for the purpose mentioned having positive means of aligning and guiding the tape during the winding operation in predetermined uniform spirals around the body on which tape is to be wound.

A further object of the present invention is to provide cam guide means in a machine of the character referred to for automatically guiding the tape in a predetermined spiral about a body having varying diameters, such, for example, as a body having a basic conical surface, merging double conical surfaces in converging or diverging relation of merging conical and cylindrical surfaces.

Another object of this invention is to provide means in a machine of the character mentioned for continuously heating the tape during the winding operation in advance of its contact with the surface on which it is being wound, as, for example, in the winding of resin impregnated fiberglass on exit cone nozzles for large rockets, or the like, to convert the resin into an effective adhesive for the tape.

A more specific object of the present invention is to provide a machine for the purpose and of the character mentioned in which the winding operation is effected through an endless belt encircling the body on which the tape is to be wound, and supported by a pivotally and vertically movable carrier controlled by cam means for guiding the tape in predetermined spirals around the body, the endless belt having a weighted idler pulley for holding it in tight tangential engagement with the body and a reversibly powered pulley for rotating the belt together with the body in either direction. The body is advanced during the winding operation by means of a lead screw engaging the end bearing supports of the cone or other body and has a pitch corresponding to the predetermined spiral of winding. By such means the tape can be wound about the body from end to end in either direction, as in the application of multiple layers of tape on the body.

The cam guide means includes a cam member specially designed for each type of spiral winding such, for example, as for a tape of one inch width having an overlap of one-half inch, or any other overlap required, and for windings on bodies of different forms or types. At the end of each winding the rotation of the belt and body is reversed and a new winding is started from the completed end from another roll or other tape source. The overlapping edges of the windings may be covered by succeeding layers of tape by advancing the body a distance equal to one half the overlap of the winding, before inserting the end of the tape to be wound between the belt and surface of the body. For example, the body would be advanced one-quarter inch for centrally covering the edges of a one-half-inch lap on the return winding. The adjacent edges of windings having no overlap may be covered in a succeeding winding in the same manner as those of overlapping windings.

The winding operations may be stopped at any point, as in building up relatively short sections of multiple windings in conical or cylindrical form.

The spiral tape windings may be started at each end on dummy extensions removably attached to the body and the tape trimmed from the extensions.

The body on which tape is to be wound may consist of a collapsible core on which tubular sections may be formed of multiple layers of tape in the same manner as in the winding on nozzles or other bodies.

Other objects and advantages of my improved spiral tape winding machine will be apparent or pointed out in the following specification in which reference is had to the accompanying drawings illustrating one embodiment of my invention and in which:

FIG. 5 is a detail view in top plan showing the manner in which the tape is wound on the body with an overlap of one half the width of the tape;

FIG. 6 is a cross-sectional view of a body through a large diameter and showing the manner of spiral tape winding thereon;

FIG. 7 is a section taken on the line 7—7 of FIG. 6;

FIG. 8 is a longitudinal detail section of the double conical body illustrated in the previous views and showing the removable dummy ends, lead screw and cam guide member;

Figure 1:
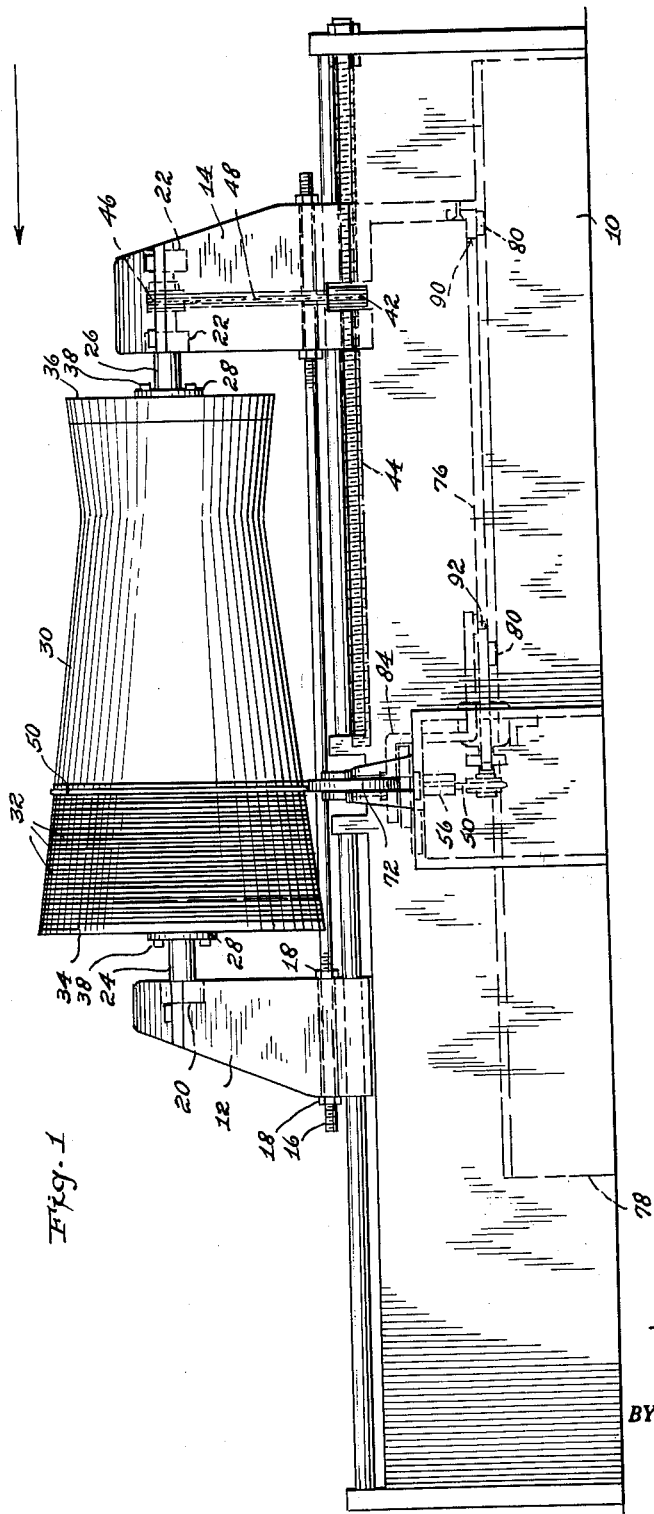
FIG. 1 is a side elevation of a spiral tape winding machine in accordance with the present invention and showing a partial spiral tape winding on a body having merging double converging conical portions.

FIG. 9 is a fragmentary section showing one layer of tape winding on a body in overlapping relation and two spirals of a return winding from the opposite end of the body covering the edges of the first winding; and FIG. 10 is a fragmentary section showing one layer of winding of tape without overlap and two spirals of a return winding from the opposite end of the body covering the adjacent edges of the first winding.

Referring to the drawing in which like numerals designate like parts or elements in the several views, 10 is an elongated base upon which is mounted for longitudinal movement thereon, in either direction, a pair of shaft bearing members 12 and 14, these members, in the form of the invention illustrated, being rigidly held in spaced relation longitudinally of the base 10 by means of rods 16 extending horizontally through openings in the members and clamped thereto by nuts 18 screwthreaded upon the end portions of the rods, which arrangement permits adjustment of the spacing between the members 12 and 14. Mounted in the shaft bearing members 12 and 14 are shaft bearings 20 and 22, which may be of roller or other suitable type; and journaled in these bearings are shaft elements 24 and 26 having longitudinally opposed flanges 28 on their inner ends for flat contact with the ends of a body 30 on which tape 32 is to be spirally wound. The body 30 illustrated is that of an exit cone nozzle for large rockets, of double converging cone design, and, for the tape winding operation, is provided with insertable or otherwise attachable, dummy ends 34 and 36 upon which the tape winding operation at either end may be started. The flanges 28 of the shaft elements 24 and 26 may be removably attached to the dummy ends by headed screws 38 projecting through holes in the flanges into threaded sockets in the dummy ends, or by other suitable means, for holding the body 30 in freely rotatable but longitudinally stationary relation with the bearing members 12 and 14. The flanges 28 may also have centering projections 40 insertable in central sockets in the dummy ends 34 and 36.

A thrust nut 42 is rotatably mounted in the lower portion of shaft bearing member 14 in threaded engagement with a lead screw 44 which is fixedly attached at one end to the base 10 in axial relation with the shaft elements 24 and 26, the pitch of the threads on the screw corresponding to the predetermined spiral of winding of the tape 32. A sprocket wheel 46 on shaft element 26 is connected by a chain 48 to the thrust nut 42 by means of which the nut is rotated once for each revolution of the body 30 mounted on the shaft elements, thereby advancing the shaft bearing members 12 and 14 together with the body 30 axially in either direction, according to the direction of rotation of the body 30, a distance equal to the axial travel of one predetermined spiral of tape winding. Obviously other suitable means may be used for effecting a predetermined axial advance of the body 30 controlled by its own rotation. As illustrated, the body 30 is rotating clockwise, as viewed from the small end, and is being axially advanced toward the small end in a spiral tape winding cycle.

The operations of the spirally winding tape 32 on the body 30 in either axial direction is accomplished by means of an endless belt 50 encircling the body 30 in offset intersecting relation below the body when mounted on the shaft elements 24 and 26, the belt continuing around flanged pulleys 52 journaled transversely in the ends of a horizontal bracket 54 below the body and extending equidistantly on each side of a rigidly connected depending stem 56 and comprising a belt carrier designated generally by the numeral 58, the stem being pivotally and slidably mounted in a stationary bearing 60 on the base 10, this stem being in perpendicular relation with the axis of the shaft elements 24 and 26. The endless belt continues around other flanged pulleys 62 journaled on the base 10 and around a flanged idler pulley 64 disposed below the pulleys 62 and connected to the piston rod 66 of an air cylinder 68 communicating at its inner end with a source of air pressure for forcing the idler pulley outwardly to draw the belt 50 into tight engagement with the body 30 and in tangential relation with said body below its vertical center. Obviously, a weight connected to the pulley 64 may be substituted for the air cylinder. The pulleys 52 are aligned toward each other in parallel offset relation so that the intersecting or crossing portions of the belt will be in closely adjacent relation. A reversible electric motor 70 or other suitable reversible driving means is connected to one of the pulleys 62 for rotating the belt 50 together with the body 30 in either direction.

Tape for the spiral winding operations is supplied from rolls 72 mounted on each side of the base 10 or from other suitable sources. With the body 30 at either limit of its axial movement the tape 32 on both sides is directed toward the adjacent end of the body in right angular relation to its axis. Assuming that the body 30 is at the limit of axial movement in the direction of the small end, to start the spiral winding operation on the larger dummy end 34 it is necessary only to insert the free end of the tape 32 from the adjacent roll 72 or tape source between the belt 50 and the larger dummy end 34 in tangential relation with the body. The winding will continue automatically, with the lead screw and thrust nut moving the body axially at the correct rate of advance until it reaches the limit of its movement with the winding ending on the other dummy end 36. The tape is then cut, the motor 70 reversed and a new layer of winding is started on the smaller dummy end 36 from the roll of tape 72 on the opposite side of the base. Assuming that the tape has a width of one inch and that the predetermined spiral of winding provides for an overlap of one-half inch, the lead screw 44 will have a one-half inch pitch, and the belt 50 will wind the first layer as shown in the larger section of FIG. 9. In the next and succeeding layers the edges of the preceding layers may be centrally covered, as shown in the smaller section of FIG. 9 by merely rotating the body 30 one-quarter turn in either direction before inserting the tape between the belt and body.

For fiberglass or other tape impregnated with resin or like substance requiring heating to convert it into an effective adhesive, the tape may be fed over a cylinder 74 heated by steam, electricity or other suitable means.

Figure 2:
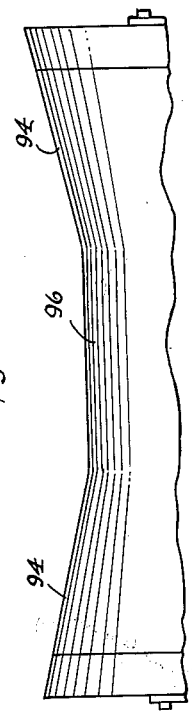
FIG. 2 is a fragmentary side view of another form of body on which spiral tape windings may be effected by the machine illustrated in FIG. 1.
Figure 3:
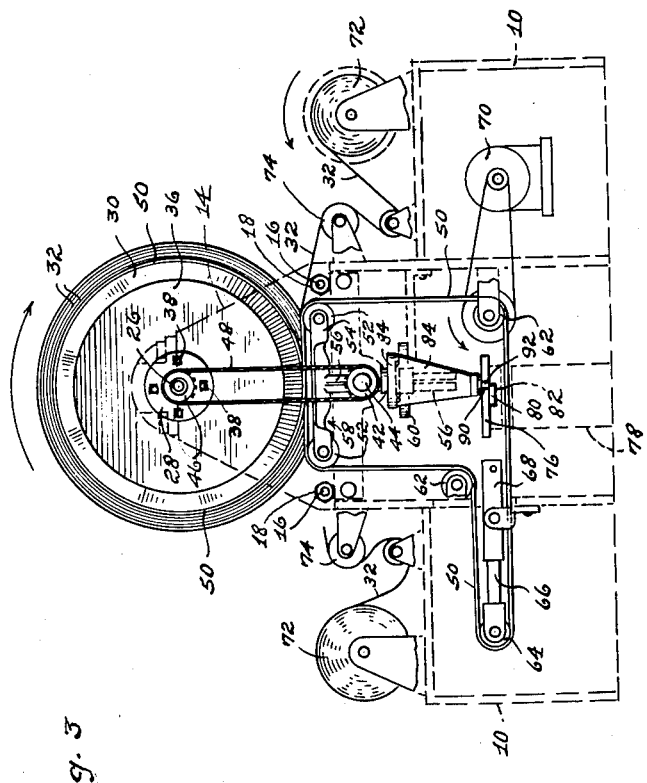
FIG. 3 is an end elevation of the machine and body illustrated in FIG. 1, but with the base of the machine and body supporting members shown in broken lines for more clearly showing the tape winding elements.
Figure 4:
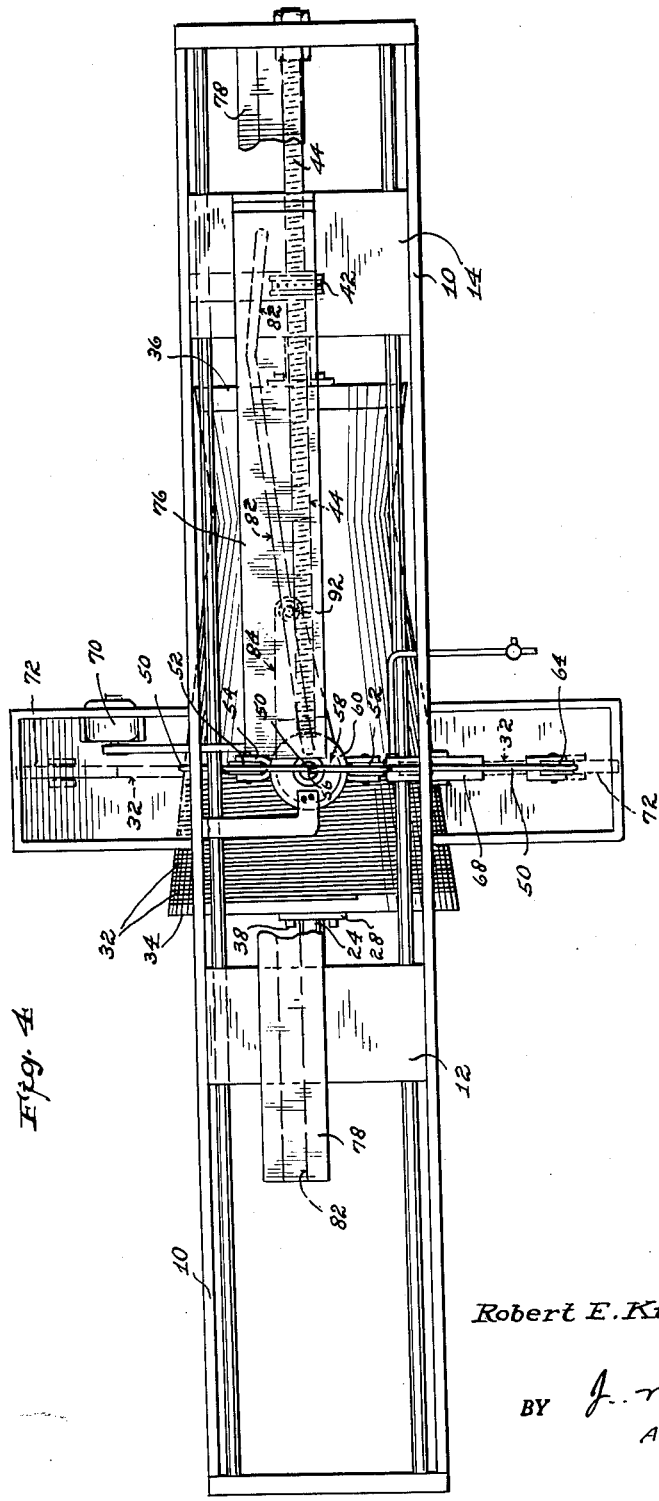
FIG. 4 is a bottom plan view of the machine shown in FIGS. 1 and 3.

As illustrated, the means for guiding the belt 50 in the correct helix angular relation around the rotating body 30 includes an elongated cam member 76 disposed in a plane below the belt carrier 58 and removably attached to the shaft bearing member 14 so that it will be movable with said member and the body 30 longitudinally of the base 10 on a support 78, shown in broken lines in FIGS. 1 and 3. However, depending projections 80 slidably engaging a groove 82 in the support 78 prevent lateral movement of the member 76. This member has a longitudinal cam track, which may be in the form of a groove 82. A lateral arm 84 is slidably mounted on the stem 56 and has a ball bearing 86 or other suitable bearing to facilitate rotary movement on the top surface of the stationary stem bearing 60. A spline or key 88 carried by the arm 84 is slidably mounted in a longitudinal groove 90 in the stem 56 and prevents relative rotation between the arm and stem. A roller 92 or other element on the outer end of a depending portion of the arm 84 rides in the cam groove 82 which pivotally moves the stem 56 and belt carrier in response to variations in the longitudinal direction of the groove. The correct helix angle of spiral 93 (FIG. 5) is determined mathematically and a separate cam member 76 having a correspondingly designed groove for pivotally guiding the belt carrier 58 and belt 50 is employed for each different form of nozzle or body 30. In single or multiple conical bodies the helix angle of spiral varies with the variations in the diameter, but a correctly designed cam arrangement as described will automatically effect the necessary changes in the angle throughout the entire axial length of the winding in either direction. It will also automatically and correctly guide the helix angle of winding of bodies having double conical sections 94 joined by a cylindrical section 96, as shown in FIG. 2.

The belt 50 is preferably V-shaped and the flanges 98 of the pulleys 52, 62 and 64 in corresponding diverging relation, as shown more clearly in FIG. 9 for greater strength, durability and effectiveness of the belt. In the embodiment of the invention illustrated the belt 50 is shown as being the width of the overlap of the tape. However, for various kinds of tape the belt may be the full width of the tape.

For tape having a water soluble adhesive a moistening roller may be substituted for the cylinder 74.

After the desired number of layers of tape has been wound on a body of conical or other form the end portions of the tape are trimmed off with a sharp tool along the lines of abutment of the dummy ends. The tape may then be stripped from the dummy ends, so that they can be used for another winding operation.

From the foregoing description it will be seen that with my improved spiral tape winding machine, tape of any width may be spirally wound on a body of any form having a circular peripheral surface with great firmness without imposing linear tensional strain on the tape and with precise uniform advance of the winding irrespective of the variations in diameter of the body in either direction; also that the machine is of simple and economical construction and simple operation. With the machine described multiple layers of spiral windings in initially overlapping, or edge to edge, relation in such axial lengths of windings as may be required and to cover all exposed edges of windings with succeeding layers are facilitated.

Obviously, various changes or modifications may be made in my improved spiral tape winding machine without departing from the spirit and scope of my invention.

Therefore, it should be understood that the embodiment of my invention illustrated and described is intended to be illustrative, only, and restricted only by the appended claims.

I claim:

1. A machine for spirally winding tape on a body having a circular peripheral surface, said machine comprising, in combination, an elongated base, a bearing unit on said base for mounting said body at its ends in freely rotatable but in longitudinally stationary relation with said unit, cooperative means connected with said body and bearing unit for effecting movement of said bearing unit together with said body longitudinally of said base in either direction at a rate of axial movement corresponding to the predetermined spiral of the tape winding, a belt carrier having an elongated horizontal bracket below said body when mounted in said bearing unit, said bracket extending equidistantly across the vertical center line of said body, said bracket also having a rigidly connected and central depending stem mounted in a vertical bearing on said base in freely pivotal and vertically movable relation therewith, flanged belt pulleys journaled transversely in the ends of said bracket in parallel, offset relation with each other, second pulleys journaled in said base below said flanged pulleys, an idler pulley disposed in a plane below the flanged pulleys on said base, an endless belt for encircling said body in offset intersecting relation below said body and continuing around all of said pulleys, force applying means engaging said idler pulley for drawing said belt into tight tangential relation with the bottom of said body; reversible driving means connected with one of said second pulleys for rotating said belt together with said body in either direction, a cam member fixedly attached to said bearing unit, an element on said depending stem cooperative with said cam member for pivotally guiding said belt carrier and belt in predetermined helical relation with said body; and tape sources on each side of said base for supplying tape to be spirally wound on said body from either of its ends between said belt and said body.

2. A machine as in claim 1 in which the body on which tape is to be wound is provided with removable extensions at its ends upon which the winding of the tape is started.

3. A machine as in claim 1 in which the body on which tape is to be wound is of conical formation.

4. A machine as in claim 1 in which the body on which tape is to be wound is of double conical formation.

5. A machine as in claim 1 in which the force applying means for drawing the belt into tight tangential relation with the bottom of the body consists of an air cylinder having the idler pulley mounted in the outer end of its piston rod.

6. A machine as in claim 1 in which the pulleys are all provided with flanges in V-formation and in which the endless belt is of corresponding cross-sectional formation.

7. A machine as in claim 1 in which the cooperative means connected with the body end bearing unit for effecting longitudinal movement of said bearing unit together with said body includes a lead screw having a pitch corresponding to the predetermined spiral of tape winding, a thrust nut mounted in said bearing unit and means connected with the body and nut for rotating said nut simultaneously with rotation of said body.

8. A machine for spirally winding tape on a body having a circular peripheral surface, said machine comprising, in combination, an elongated base, a bearing unit on said base for mounting said body at its ends in freely rotatable but in longitudinally stationary relation with said unit, a lead screw having a pitch corresponding to the predetermined spiral of the tape winding fixedly mounted at one end on said base in longitudinal relation therewith, a thrust nut rotatably mounted on said bearing unit in threaded engagement with said screw, cooperative means connected with said body and said nut for rotating said nut to effect movement of said bearing unit together with said body longitudinally of said base in either direction, a belt carrier having an elongated horizontal bracket below said body when mounted on said bearing unit, said bracket extending equidistantly across the vertical center line of said body, said bracket also having a rigidly connected and central depending stem mounted in a vertical bearing on said base in freely pivotal and vertically movable relation therewith, flanged belt pulleys, journaled transversely in the ends of said bracket in parallel, offset relation with each other, second pulleys journaled in said base below said flanged pulleys, an idler pulley disposed in a plane below the flanged pulleys on said base, an endless belt for encircling said body in offset intersecting relation below said body and continuing around all of said pulleys, force applying means engaging said idler pulley for drawing said belt into tight tangential relation with the bottom of said body; reversible driving means connected with one of said second pulleys for rotating said belt together with said body in either direction, an elongated cam member fixedly attached to said bearing unit in longitudinal relation with and movable with said body, an element on said depending stem cooperative with said cam member for pivotally guiding said belt carrier and belt in predetermined helical relation with said body during the tape winding operation in either axial direction of movement of said body; and tape sources on each side of said base for supplying tape to be spirally wound on said body from either of its ends between said belt and said body.

9. A machine for spirally winding tape on a body having a circular peripheral surface, said machine comprising, in combination, an elongated base, a pair of shaft bearing members having means for connecting them together in rigid, longitudinally spaced relation on said base, shaft elements engaging the ends of said body and said bearing members for supporting said body in rotatable but longitudinally stationary relation with said members, a lead screw having a pitch corresponding to the predetermined spiral of tape winding fixedly mounted on said base in parallel relation with the axis of said body and shaft elements and traversing one of said bearing members, a thrust nut on said bearing member in threaded engagement with said screw, drive means on the shaft element in the latter bearing member connected with said thrust nut for rotating said nut simultaneously with rotation of said body for effecting movement of said bearing members together with said body longitudinally of said base in either direction, a belt carrier having an elongated horizontal bracket below said body, when mounted in said bearing members, said bracket extending equidistantly across the vertical center line of said body, said bracket also having a central depending stem mounted in a vertical bearing on said base in freely pivotal and vertically movable relation therewith, flanged belt pulleys journaled transversely in the ends of said bracket in parallel, offset relation with each other, second pulleys journaled in said base below said flanged pulleys, an idler pulley disposed in a plane below the flanged pulleys on said base, an endless belt for encircling said body in offset intersecting relation below said body and continuing around all of said pulleys, force applying means engaging said idler pulley for drawing said belt into tight tangential relation with the bottom of said body; reversible driving means connected with one of said second pulleys for rotating said belt together with said body in either direction, an elongated cam member having a longitudinal cam track, said member being fixedly attached to one of said shaft bearing members for longitudinal movement with said members and said body, an arm keyed to said depending stem in vertically slidable relation therewith and having at its free end an element cooperative with said cam track for pivotally guiding said belt carrier and belt in predetermined helical relation with said body; and tape sources on each side of said base for supplying tape to be spirally wound on said body from either of its ends between said belt and said body.

10. A machine as in claim 9 in which the means for connecting the pair of shaft bearing members together consist of rods extending longitudinally of said base and screwthreaded at their ends, said rods projecting through openings in said members and clamped thereto by nuts on opposite sides of the members, thereby permitting adjustments of the longitudinal spacing of said members.

11. A machine as in claim 9 in which the longitudinal cam track of the cam member consists of a groove in said member, and in which the element on the end of the arm on the depending stem of the belt carrier consists of a projection engaging said groove and laterally movable to vary the angular relation of said belt carrier with that of said body in response to lateral variations in said groove throughout its length during simultaneous longitudinal movement of said cam member and said body.

References Cited in the file of this patent
UNITED STATES PATENTS

| | | |
|---|---|---|
| 1,807,869 | Okey | June 2, 1931 |
| 1,985,997 | Keeran | Jan. 1, 1935 |
| 2,168,203 | Green | Aug. 1, 1939 |
| 2,633,976 | Knowland | Apr. 7, 1953 |